INVENTOR
Ralph Karsten
by McDougall, Hersh, Scott and Ladd
Att'ys

United States Patent Office 3,531,367
Patented Sept. 29, 1970

3,531,367
PANELS OF POLYOLEFIN FILM AND FOAMED POLYSTYRENE AND METHOD
Ralph Karsten, Chicago, Ill., assignor to Chicago Screen Print, Inc., Chicago, Ill., a corporation of Illinois
Filed Sept. 22, 1966, Ser. No. 581,298
Int. Cl. B32b 5/28; C09j 5/02
U.S. Cl. 161—160
9 Claims

ABSTRACT OF THE DISCLOSURE

A method of producing a sandwiched panel of foamed polystyrene and sheet polyolefin and the product therefrom, wherein the surfaces of the polyolefin sheets to be bonded are wetted with a solution of an organic solvent in which the foamed polystyrene is soluble and having dissolved therein a polystyrene polymer, and then processing the polystyrene and sheet polyolefin together until the bond is set between the surfaces. In accordance with another embodiment an ethyl cellulosic-phenolic resin is used in place of the polystyrene in the solvent solution.

---

This invention relates to laminates in the form of flexible sheets of foamed polystyrene sandwiched with film polyolefin and to a method for the preparation of same, and it relates more particularly to a laminate of foamed polystyrene and spun-bonded polyolefin films or sheets.

When use is made of a hydrocarbon solvent for reducing the surfaces of a foamed polystyrene to the adhesive stage for lamination with a film or sheet, such as of a polyolefin, the hydrocarbon appears to continue its softening action beyond the amount required for lamination with the result that the sandwich that is formed is too soft and portions of the foamed layer immediately adjacent the laminated film collapse with resulting stiffness and irregularities in the fabricated laminate.

Modification to reduce the amount of solvent or the method of application of the solvent has been tried but without corresponding success. When the amount of solvent is reduced, insufficient adhesiveness develops such that a strongly bonded sandwich is difficult to achieve. Modification in the method of application of the solvent as by treatment of the surface of the foam, wetting the surface of the film, or both, does not alleviate the problem.

It is an object of this invention to produce and to provide a method for producing sandwiches or laminates of foamed polystyrene and a polyolefin film or sheet in which a strong and uniform interbonded relationship is established therebetween, in which a laminate is secured which is substantially free of collapse of portions of the foamed layer adjacent the polyolefin film or sheet whereby a smooth and attractive sandwich is secured, in which excessive softening of the foamed poystyrene does not occur during fabrication or use and in which a strong, highly flexible laminated sheet can be secured.

It is an object of this invention to produce a laminate of the type described having the characteristics of a strong, flexible sheet material having good feel and weathering characteristics whereby use can be made thereof for indoor or outdoor display panels or as a structural material having an attractive appearance and feel and it is a related object to provide a panel of the type described having an improved appearance and feel and which is capable of receiving and holding printing inks and coloring compositions for use in fabrication of attractive outdoor displays.

These and other objects and advantages of this invention will hereinafter appear and for purposes of illustration, but not of limitation, an embodiment of the invention is shown in the accompanying drawing, in which.

This invention will be described with reference to a sandwich or laminate in which the foamed polystyrene layer 10 comprises a foamed polystyrene sheet of the type marketed by the Sekisui Plastic Corporation of New York, New York, and in which the polyolefin film is a material identified as a spun-bonded polyolefin of the type marketed by E. I. du Pont de Memours & Company, Wilmington, Delaware, under the trade name "Du Pont Tyvac." While the above find excellent use in the practice of this invention, it will be understood that the inventive concepts are applicable to foamed polystyrene sheets of other manufacture and to sheets or films of polyolefin formed preferably of bonded polyolefin fibers.

It has been found, in accordance with the practice of this invention, that a strong and permanent interbonded relationship can be established without tack or deterioration of the foamed polystyrene layer when the fluid system applied to establish the adhesiveness between the polyolefin and the foamed polystyrene is formulated of an aromatic hydrocarbon in which the polystyrene polymer is soluble but in which a substantial amount of foamed or polymerized polystyrene has been dissolved. Under such conditions, the fluid system appears to wet out the surface portions of the layer of the foamed polystyrene without deep penetration into the foamed layer and without deterioration of the foamed polystyrene when wet with the solvent system.

As the solvent component of the treating fluid, use can be made of such relatively high boiling aromatic solvents as xylol, naphtha, toluol, and the like. While it is preferred to make use of an aromatic sovent in which the foamed polystyrene polymer is soluble, other organic aliphatic, aromatic or mixed aliphatic aromatic solvents, ethers and esters can be used in which the polystyrene polymer is soluble, such as methyl ethyl ketone, ethyl acetate, amyl acetate, ethylene dichloride, chlorobenzyl, and the like.

The desired results are secured when the polystyrene polymer is dissolved in the solvent system in the ratio of more than one part by weight of the polystyrene polymer to 20 parts by weight of the solvent but it is preferred to make use of a system containing one part by weight of the polystyrene polymer to 4 to 10 parts by weight of the solvent.

The following will illustrate the practice of this invention:

Example 1

Figure 1:
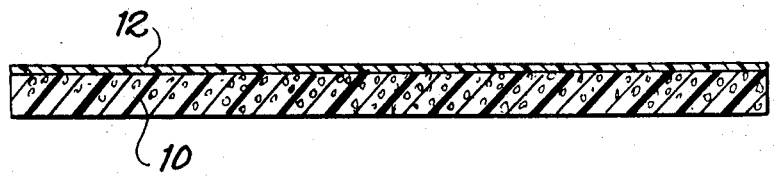
FIG. 1 is a sectional elevational view of one form of laminate produced in accordance with the practice of this invention.

In fabricating the laminate of FIG. 1, the spun-bonded polyolefin sheet 12, having a thickness of .008 to .012 inch, is thoroughly wet on one side with an 8% solution of foamed polystyrene in xylol. The sheet is shaken to remove excess fluid and the wetted side is pressed firmly onto one surface of a layer 10 of foamed polystyrene of the type marketed by the Sekisui Plastics Corporation, having a thickness of about ⅛ inch. The assembly is maintained in pressure contact for from 1 to 15 minutes until a strong and permanent bonded relationship has been established.

Example 2

Figure 2:
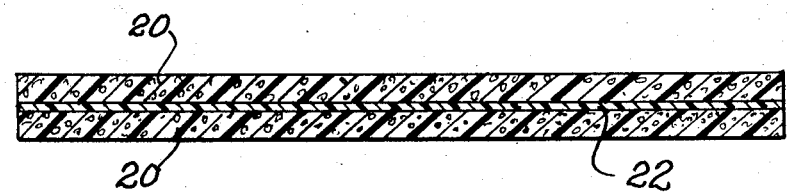
FIG. 2 is a sectional elevational view similar to that of FIG. 1 showing another arrangement of elements making up the laminate.

In the fabrication of the sandwich of FIG. 2, the spun-bonded polyolefin sheet 22 having a thickness of about .01 inch is dipped in a solution of 20% by weight foamed polystyrene in naphtha. The polyolefin film is passed through squeegee rolls to remove excess fluid and placed between two sheets 20 of foamed polystyrene having a thickness of ⅛ to ¼ inch and the assembly is held under compression for about 2 to 10 minutes to set the bond.

Example 3

Figure 3:
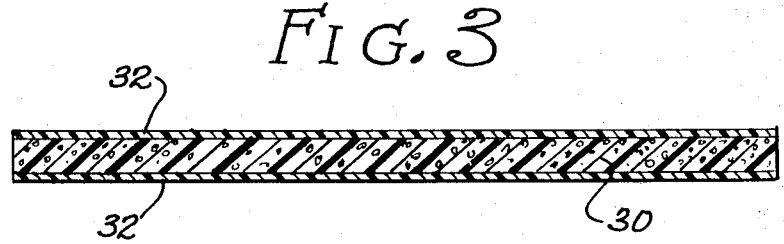
FIG. 3 is a sectional elevational view similar to that of FIGS. 1 and 2 showing a still further modification in the construction of a laminate.

In the fabrication of the sandwich illustrated in FIG. 3, the two sheets of the spun-bonded polyolefin film 32, having a thickness within the range of .01 to .02 inch, are wet on one side with a solution of foamed polystyrene dissolved in xylol in an amount corresponding to 20 parts by weight of the polystyrene to 100 parts by weight of the xylol. The sheet 30 of foamed polystyrene is placed between the sheets 32 of polyolefin with the wetted surfaces facing the opposite sides of the sheet 30 and the assembly is held under compression for a few minutes to set the bond.

A uniform bond develops in each instance across the entire cross-section of the adjacent layers and the exposed surface of the polyolefin film, in Examples 1 and 3, give no indication of adverse effects from the bonding agent applied to its opposite surface. Similarly, none of the polystyrene adjacent the bonded surfaces indicate collapse of the foam or excessive softening through a cross-section of the foam. Instead, the surface of the foamed polystyrene appears intact and strongly bonded to the adjacent surface of the polyolefin sheet.

It appears that the solvent component, which is applied to the surfaces of the polyolefin to effect the bonded relationship with the foamed polystyrene, is satisfied, for the most part, by the solution of the polystyrene polymer therein so that there is less tendency for the liquid rapidly to dissolve foamed polystyrene when carried into contact therewith on the surfaces of the polyolefin layer. As a result, the binder system operates primarily to effect the desired adhesiveness at the surfaces of the foamed polystyrene to effect the desired interbonded relationship between the formed polystyrene surface and the adjacent surface of the polyolefin film whereby a strong and permanent interbonded relationship is establish without excessive solution of softening of the surface portions of the foamed polystyrene layer.

Thus the sandwiched layer composite provides an assembly which is characterized by high strength and good flexibility when only a single sheet of polyolefin is embodied in the laminate, as in FIGS. 1 and 2, and a laminate of high strength and flexibility results when the polystyrene layer is sandwiched between films of polyolefin, as in FIG. 3.

Figure 4:
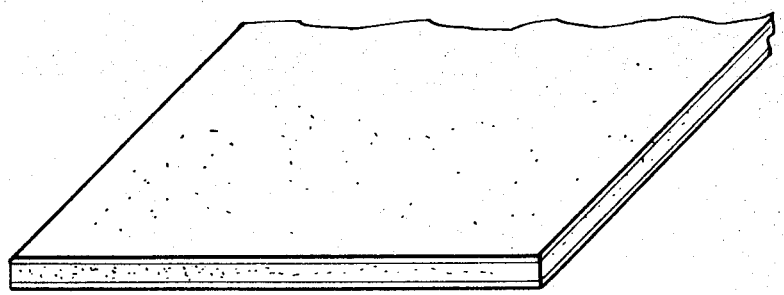
FIG. 4 is a perspective view of a printed display panel prepared with the laminates of this invention.

The resulting sandwich represents a relatively soft, flexible sheet of high strength and high durability and which is capable of widespread use. Since the spun-bonded polyolefin represents a stable, printable surface and the foamed polystyrene core provides dimension and feel to the sheet without materially adding to its weight, the assembly finds excellent use as a panel for use in the construction of outdoor posters characterized by high strength, good body, and flexibility, and which can stand up under adverse weather conditions without deterioration. Because of the attractive appearance of the formed sandwich panels and the printable characteristics of the exposed surface portions, the panel finds excellent use as an attractive display material or poster, as illustrated in FIG. 4.

While not equivalent to the bonding fluid formulated of a liquid which is a solvent for the foamed polystyrene and which is satisfied, at least in part, by the solution of polystyrene polymer therein to effect the desired interbonded relationship between the face of the polyolefin film and the surface of the foamed polystyrene, an assembly embodying many of the improvements described can also be fabricated with a fluid binder composition which is employed in the same manner but in which the composition is formulated of a phenolic resin modified ethyl cellulose or ethyl hydroxy ethyl cellulose dissolved in a solvent system which softens or dissolves polystyrene polymers, such as may be formulated of a medium to high boiling fraction of an aromatic hydrocarbon solvent, such as xylene, as represented by the following example:

Example 4

27 parts by weight ethyl cellulose-phenolic resin (11017-55 clear of Naz-Dar Company).
74 parts by weight xylene hydrocarbon (SC 150 of Central Solvents and Chemical Company, Chicago, Illinois).

The binder fluid is applied to the surface of the polyolefin sheet to be laminated and the wetted surface is pressed onto the surface of the foamed polystyrene layer and held there to effect interbonding.

It will be apparent from the foregoing that I have provided a new and improved concept for the fabrication of laminates of specific materials including a foamed polystyrene layer or sheet and a film or sheet of a polyolefin resin whereby a strong and permanent bonded relationship is established between the layers to effect an attractive panel having strength and flexibility as well as good appearance and printability whereby such laminated panel can be employed as a structural material or as a panel for use in display, advertisement, and other purposes.

It will be understood that changes may be made in the details of formulation and construction without departing from the spirit of the invention, especially as defined in the following claims.

I claim:
1. The method of producing a sandwiched panel of foamed polystyrene and sheet polyolefin comprising the steps of wetting the surfaces of the polyolefin sheet to be bonded with the polystyrene with a solution consisting essentially of an organic solvent in which the foamed polystyrene is soluble and having a polystyrene polymer dissolved there in in an amount greater than one part by weight of the polystyrene polymer to 20 parts by weight of the solvent, and then pressing the wetted surface of the polyolefin sheet onto the surface of the foamed polystyrene until the bond is set between the surfaces.

2. The method as claimed in claim 1 in which the polystyrene polymer is present in the solution in an amount within the range of one part by weight of the polystyrene polymer to 4–10 parts by weight of the solvent.

3. The method as claimed in claim 1 in which the polyolefin sheet is a spun-bonded polyolefin.

4. The method as claimed in claim 1 in which the polyolefin sheet is wet on both sides and layers of foamed polystyrene are bonded thereto with the polyolefin sheet in between.

5. The method as claimed in claim 1 in which the organic solvent is an aromatic solvent.

6. The method as claimed in claim 1 in which the solvent comprises xylol.

7. A sandwich comprising a layer of foamed polystyrene and a sheet of polyolefin bonded one to the other across their adjacent surfaces and prepared by the method of claim 1.

8. The method of producing a sandwiched panel of one or more layers of foamed polystyrene and one or more layers of a polyolefin sheet comprising the steps of wetting the surface of the polyolefin sheet to be bonded with the polystyrene with a solution formulated of an organic solvent in which the foamed polystyrene is soluble and having an ethyl cellulose-phenolic resin dissolved therein in an amount greater than one part by weight of the resin to 20 parts by weight of the solvent and then pressing the wetted surface of the polyolefin sheet onto the surface of the foamed polystyrene until the bond is set between the surfaces.

9. The method as claimed in claim 8 in which the polyolefin sheet is a spun-bonded polyolefin.

References Cited

UNITED STATES PATENTS

| | | | |
|---|---|---|---|
| 2,521,470 | 9/1950 | Matheson | 156—308 |
| 2,628,180 | 2/1953 | Iverson | 156—308 |
| 3,276,944 | 10/1966 | Levy | 161—150 |

WILLIAM J. VAN BALEN, Primary Examiner

U.S. Cl. X.R.

156—307; 161—161